United States Patent
Hirabayashi (10) Patent No.: US 9,887,615 B1
(45) Date of Patent: Feb. 6, 2018

(54) BIDIRECTIONAL INSULATED DC-DC CONVERTER

(71) Applicant: KABUSHIKI KAISHA TOYOTA JIDOSHOKKI, Kariya, Aichi-ken (JP)

(72) Inventor: Nobuo Hirabayashi, Aichi-ken (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 0 days.

(21) Appl. No.: 15/655,357

(22) Filed: Jul. 20, 2017

(30) Foreign Application Priority Data

Jul. 27, 2016 (JP) .................. 2016-147111

(51) Int. Cl.
*H02M 3/335* (2006.01)
*H02M 1/088* (2006.01)
*H02M 1/00* (2006.01)

(52) U.S. Cl.
CPC ....... *H02M 1/088* (2013.01); *H02M 3/33584* (2013.01); *H02M 3/33592* (2013.01); *H02M 2001/0048* (2013.01)

(58) Field of Classification Search
CPC ...... H02M 3/22; H02M 3/24; H02M 3/33569; H02M 3/33538; H02M 3/33546
See application file for complete search history.

(56) References Cited

U.S. PATENT DOCUMENTS

2008/0074905 A1\* 3/2008 Moiseev ........... H02M 3/33584
363/20
2010/0246215 A1\* 9/2010 Mase ..................... H02M 1/36
363/21.04

FOREIGN PATENT DOCUMENTS

JP 2007-318849 A 12/2007
JP 2015-228788 A 12/2015

\* cited by examiner

*Primary Examiner* — Adolf Berhane
*Assistant Examiner* — Afework Demisse
(74) *Attorney, Agent, or Firm* — Sughrue Mion, PLLC (57) ABSTRACT

A bidirectional insulated DC-DC converter includes a transformer, a secondary circuit, and a control circuit. When electric power is transferred from the secondary side to the primary side of the transformer, the control circuit measures a first voltage on a high voltage side of the transformer and a second voltage on a low voltage side of the transformer in each cycle time. When the voltage ratio is a reference value or larger, the control circuit calculates a first period during which the control circuit turns ON the first switching element and a second period during which the control circuit turns ON the second switching element after the first period of the cycle time so that a period ratio is larger than a reference value and controls the first switching element and the second switching element based on the first period and the second period.

8 Claims, 10 Drawing Sheets

BIDIRECTIONAL INSULATED DC-DC CONVERTER

BACKGROUND OF THE INVENTION

The present invention relates to a bidirectional insulated DC-DC converter.

In a bidirectional insulated DC-DC converter, electric power is transferred from a secondary side to a primary side of a transformer. For example, in precharge operation, the bidirectional insulated DC-DC converter controls two switching elements which are provided in a secondary circuit connected to the secondary winding of the transformer to perform synchronous rectification for transferring electric power.

Japanese Patent Application Publication No. 2015-228788 discloses such a bidirectional insulated DC-DC converter.

There are provided switching elements for synchronous rectification in the secondary circuit for a transformer of the bidirectional insulated DC-DC converter. When electric power is transferred from the secondary side to the primary side of the transformer, the switching elements are controlled to be turned ON (closed) and OFF (opened). Depending on the duty of the switching elements, no electric power may be transferred during a period of a cycle time, which reduces the efficiency of transferring of electric power from the secondary side to the primary side of the transformer.

The present invention which has been made in light of the problems mentioned above is directed to providing a bidirectional insulated DC-DC converter that reduces the period during which no electric power is transferred for a cycle time during transferring of electric power from a secondary side to a primary side of a transformer.

SUMMARY OF THE INVENTION

In accordance with a first aspect of the present invention, there is provided a bidirectional insulated DC-DC converter that includes a transformer having a primary winding and a secondary winding, a secondary circuit connected to the secondary winding of the transformer and including a coil, a first switching element, and a second switching element; wherein a first terminal of the coil and a first terminal of the first switching element are connected to a first terminal of the secondary winding of the transformer, wherein a first terminal of the second switching element is connected to a second terminal of the secondary winding, and wherein a second terminal of the first switching element and a second terminal of the second switching element are connected to each other, and a control circuit controlling the first switching element and the second switching element. When electric power is transferred from the secondary side to the primary side of the transformer, the control circuit measures a first voltage VH that denotes a DC voltage of the primary winding on a high voltage side of the transformer and a second voltage VL that denotes a DC voltage of the secondary winding on a low voltage side of the transformer in each cycle time. The control circuit calculates a voltage ratio n, or VH/VL. When the voltage ratio n is a reference value J, or 1/(1+L1/2Lm) or larger, where L1 denotes inductance of the coil and Lm denotes exciting inductance of the transformer, the control circuit calculates a first period during which the control circuit turns ON the first switching element and a second period during which the control circuit turns ON the second switching element after the first period of the cycle time so that a period ratio dn, or the first period/the second period is larger than a reference value dJ, or n(1+L1/2Lm)−1 and controls the first switching element and the second switching element based on the first period and the second period.

In accordance with a second aspect of the present invention, there is provided a bidirectional insulated DC-DC converter that includes a transformer having a primary winding and a secondary winding, a secondary circuit connected to the secondary winding of the transformer and including a coil, a first switching element, and a second switching element; wherein a first terminal of the first switching element is connected to a first terminal of the secondary winding of the transformer, wherein a first terminal of the second switching element is connected to a second terminal of the secondary winding, wherein a first terminal of the coil is connected to a third terminal of the secondary winding, or an intermediate terminal of the secondary winding, and wherein a second terminal of the first switching element and a second terminal of the second switching element are connected to each other, and a control circuit controlling the first switching element and the second switching element. When electric power is transferred from the secondary side to the primary side of the transformer, the control circuit measures a first voltage VH that denotes a DC voltage of the primary winding on a high voltage side of the transformer and a second voltage VL that denotes a DC voltage of the secondary winding on a low voltage side of the transformer in each cycle time or in half of the cycle time. The control circuit calculates a voltage ratio n, or VH/VL. When the voltage ratio n is a reference value J, or 1/(1+L1/2Lm) or larger, where L1 denotes inductance of the coil and Lm denotes exciting inductance of the transformer, the control circuit calculates a first period during which the control circuit turns ON the first switching element and the second switching element in a former half period of the cycle time and in a latter half period of the cycle time and a second period during which the control circuit turns OFF the first switching element and turns ON the second switching element after the first period in the former half period of the cycle time and turns ON the first switching element and turns OFF the second switching element after the first period in the latter half period of the cycle time so that a period ratio dn, or the first period/the second period is larger than a reference value dJ, or n(1+L1/2Lm)−1 and controls the first switching element and the second switching element based on the first period and the second period.

Other aspects and advantages of the invention will become apparent from the following description, taken in conjunction with the accompanying drawings, illustrating by way of example the principles of the invention.

BRIEF DESCRIPTION OF THE DRAWINGS

The invention together with objects and advantages thereof, may best be understood by reference to the following description of the presently preferred embodiments together with the accompanying drawings in which.

DETAILED DESCRIPTION OF THE EMBODIMENTS

The following will describe embodiments of the present invention with reference to the accompanying drawings.

First Embodiment

Figure 1:
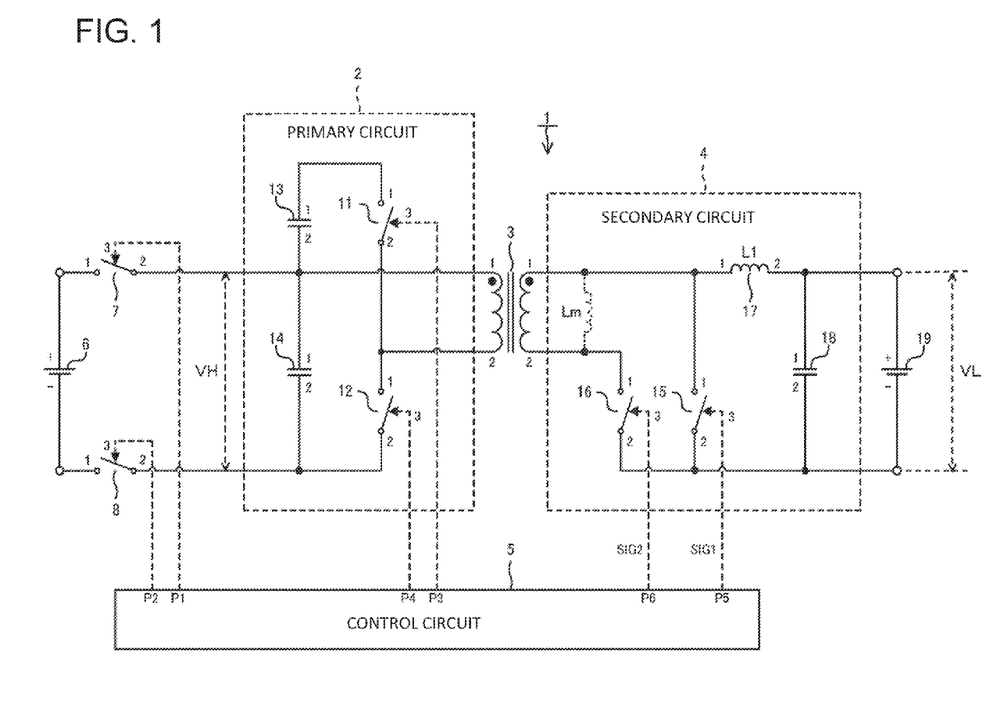
FIG. 1 is a circuit diagram of a bidirectional insulated DC-DC converter according to a first embodiment of the present invention.

Referring to FIG. 1, there is shown a bidirectional insulated DC-DC converter 1 according to a first embodiment of the present invention. The bidirectional insulated DC-DC converter 1 is a forward DC-DC converter of an active-clamp system, including a primary circuit 2, a transformer 3, a secondary circuit 4, and a control circuit 5.

The primary circuit 2 includes a switching element 11, a switching element 12, a capacitor 13, and a capacitor 14. The primary circuit 2 is connected in parallel to a high-voltage battery 6 via a relay 7 and a relay 8 on the high voltage side of the primary circuit 2 and to a primary winding of the transformer 3 on the low voltage side thereof. The positive terminal (+) of the high-voltage battery 6 is connected to the first terminal (1) of the relay 7. The negative terminal (−) of the high-voltage battery 6 is connected to the first terminal (1) of the relay 8. The second terminal (2) of the relay 7 is connected to the first terminal (1) of the primary winding of the transformer 3, the second terminal (2) of the capacitor 13, and the first terminal (1) of the capacitor 14. The second terminal (2) of the relay 8 is connected to the second terminal (2) of the switching element 12 and the second terminal (2) of the capacitor 14. The first terminal (1) of the switching element 11 is connected to the first terminal (1) of the capacitor 13. The second terminal (2) of the switching element 11 is connected to the second terminal (2) of the primary winding of the transformer 3 and the first terminal (1) of the switching element 12. The third terminal (3) of the relay 7 is connected to the control terminal P1 of the control circuit 5. The third terminal (3) of the relay 8 is connected to the control terminal P2 of the control circuit 5. The third terminal (3) of the switching element 11 is connected to the control terminal P3 of the control circuit 5. The third terminal (3) of the switching element 12 is connected to the control terminal P4 of the control circuit 5.

The secondary circuit 4 includes a switching element 15 (the first switching element of the present invention), a switching element 16 (the second switching element of the present invention), a coil 17, and a capacitor 18. The secondary circuit 4 is connected in parallel to the secondary winding of the transformer 3 on the high voltage side of the secondary circuit 4 and to a low-voltage battery 19 on the low voltage side of the secondary circuit 4. The first terminal (1) of the switching element 15 is connected to the first terminal (1) of the secondary winding of the transformer 3 and the first terminal (1) of the coil 17. The first terminal (1) of the switching element 16 is connected to the second terminal (2) of the secondary winding of the transformer 3. The second terminal (2) of the coil 17 is connected to the first terminal (1) of the capacitor 18 and the positive terminal (+) of the low-voltage battery 19. The second terminal (2) of the switching element 15 and the second terminal (2) of the switching element 16 are connected to the second terminal (2) of the capacitor 18 and the negative terminal (−) of the low-voltage battery 19. The third terminal (3) of the switching element 15 is connected to the control terminal P5 of the control circuit 5. The third terminal (3) of the switching element 16 is connected to the control terminal P6 of the control circuit 5.

The control circuit 5 generates signals that control ON (closed) and OFF (opened) operation of the relays 7, 8 and the switching elements 11, 12, 15, 16 for controlling charging of the low-voltage battery 19 by electric power supplied from the high-voltage battery 6 (i.e. controlling by the active clamp system) and charging of the capacitor 14 by the voltage of the low-voltage battery 19 (i.e. precharge controlling by the active clamp system). The control circuit 5 includes a programmable device such as a Central Processing Unit (CPU), a multi-core CPU, a Field Programmable Gate Array (FPGA), or a Programmable Logic Device (PLD).

When the control circuit 5 generates signals to turn ON the relays 7, 8, the high-voltage battery 6 is connected to the capacitor 14. When the control circuit 5 generates signals to turn OFF the relays 7, 8, the high-voltage battery 6 is disconnected from the capacitor 14.

The switching elements 11, 12, 15, 16 may be provided by a semiconductor switching device such as a Metal Oxide Semiconductor Field Effect Transistor (MOSFET) and an Insulated Gate Bipolar Transistor (IGBT). For example, when the switching device is an N-channel MOSFET, the first terminals (1) of the switching elements 11, 12, 15, 16 are a drain terminal and the second terminals (2) are a source terminal and the third terminals (3) are a gate terminal. It is noted that a control signal SIG1 generated from the control terminal P5 of the control circuit 5 is a signal for controlling ON/OFF operation of the switching element 15 and a control signal SIG2 generated from the control terminal P6 of the control circuit 5 is a signal for controlling ON/OFF operation of the switching element 16.

Figure 2A:
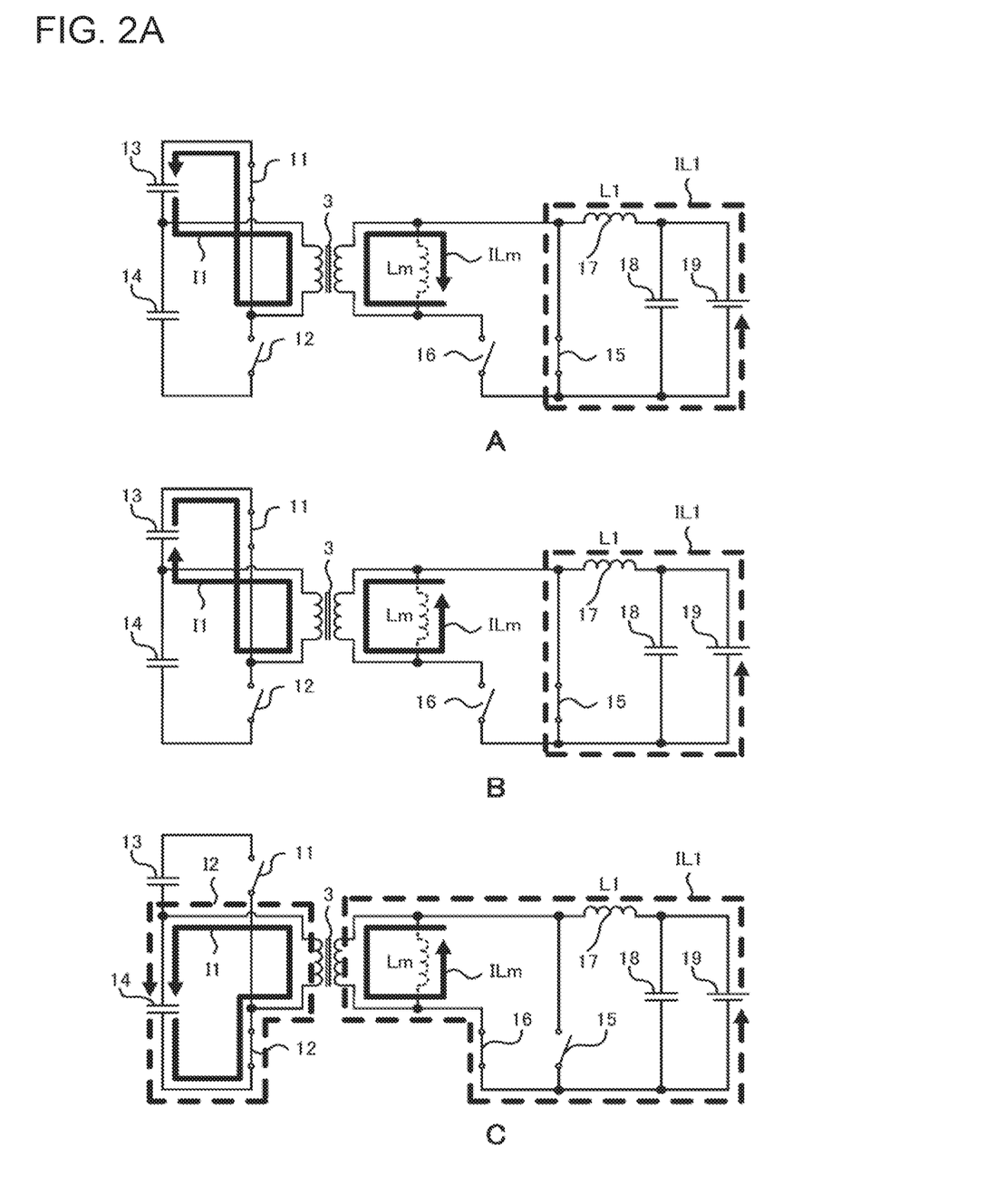
FIG. 2A includes three circuit diagrams A, B, C each showing coil current and exciting current flowing in the bidirectional insulated DC-DC converter of FIG. 1 in three different states thereof during the precharge operation.
Figure 2B:
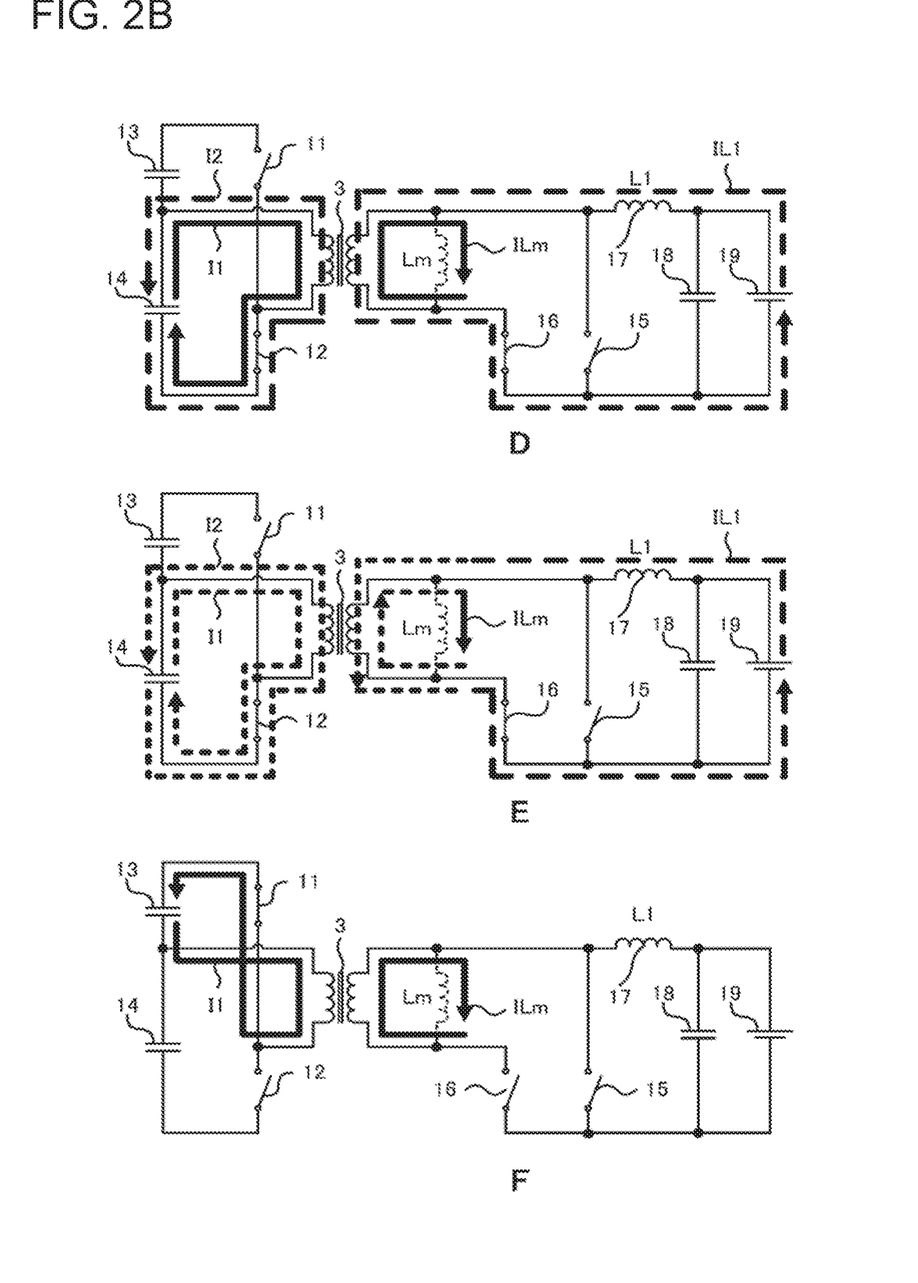
FIG. 2B includes three circuit diagrams D, E, F each showing coil current and exciting current flowing in the bidirectional insulated DC-DC converter of FIG. 1 in three different states thereof during the precharge operation.
Figure 3A:
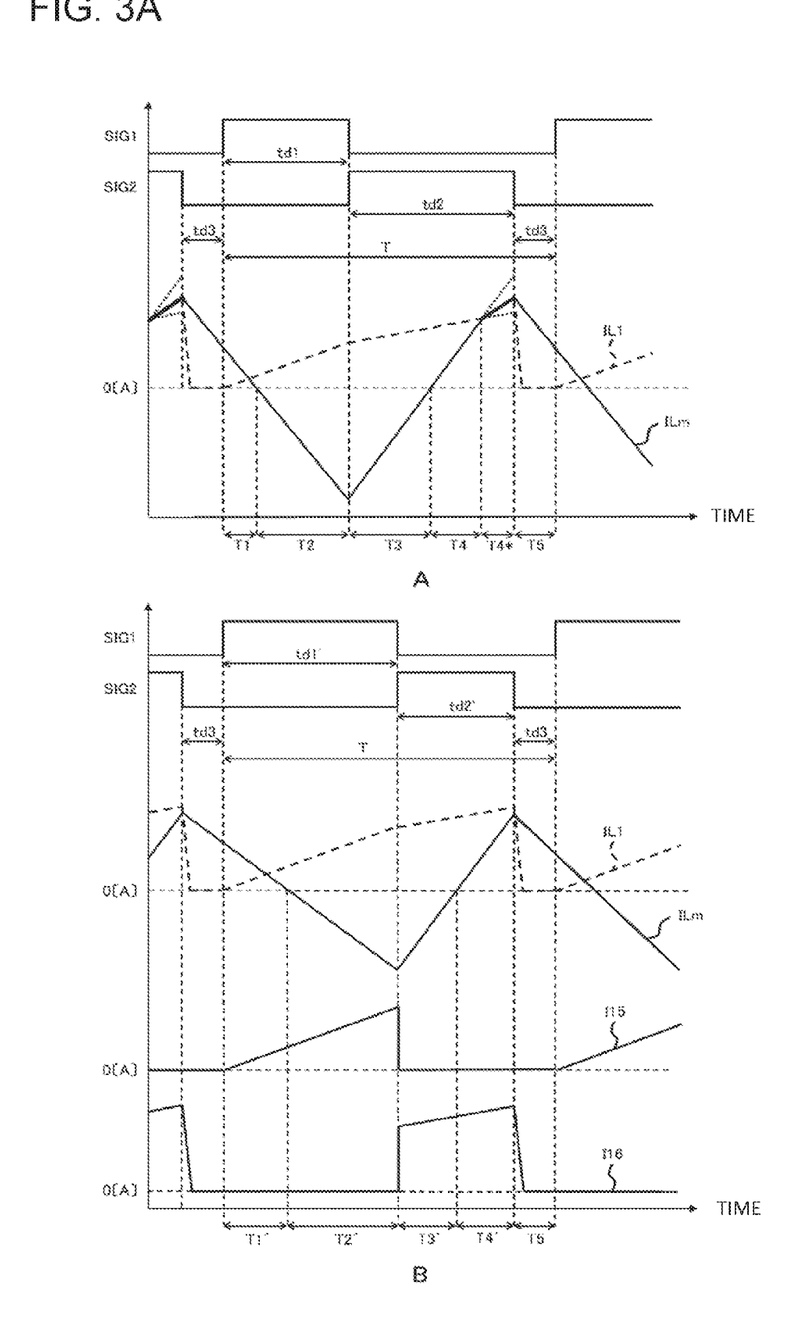
FIG. 3A shows the control signals that control switching elements of a secondary circuit, the coil current, the exciting current, and the current that flows in the switching elements in two different cases, namely case A in which failure in electric power transfer occurs and case B in which failure in electric power transfer is avoided in an initial stage of precharge operation of the bidirectional insulated DC-DC converter of FIG. 1, respectively.

The following will describe the precharge operation while referring to FIGS. 2A, 2B, and 3A. FIGS. 2A and 2B are circuit diagrams showing coil current IL1 and exciting current ILm in the precharge operation of the bidirectional insulated DC-DC converter according to the first embodiment. The diagrams in FIG. 3A show control signals SIG1, SIG2 that control the switching elements 15, 16 of the secondary circuit 4, coil current IL1, exciting current ILm, and currents I15, I16 that flow in the switching elements 15, 16, respectively, in one case A in which failure in electric power transfer occurs and in the other case B in which failure in electric power transfer is avoided in the initial stage of the precharge operation of the bidirectional insulated DC-DC converter according to the first embodiment.

In carrying out the precharge, or transferring electric power from the secondary side to the primary side of the transformer 3, the control circuit 5 generates signals to turn OFF the relays 7, 8 and the sequence of steps S1 to S4, which will be described later, is repeated for each cycle time T thereby to control charging of the capacitor 14.

At step S1, before start of the next cycle time T begins, the control circuit 5 calculates the period td1 in the cycle time T during which the switching element 15 is turned ON, the period td2 in the cycle time T during which the switching element 16 is turned ON after the period td1, and period td3 in the cycle time T during which the switching elements 15, 16 are turned OFF after the period td2.

At step S2, the control circuit 5 generates signals to turn ON the switching elements 11, 15 and turn OFF the switching elements 12, 16. As a result, as shown in the circuit diagram A of FIG. 2A, the coil current IL1 (dashed line) flows from the positive terminal of the low-voltage battery 19 through the coil 17 and the switching element 15 to the negative terminal of the low-voltage battery 19, so that energy is accumulated in the coil 17. The exciting current ILm (solid line) flows from the first terminal of the secondary winding of the transformer 3 through the exciting inductance Lm to the second terminal of the secondary winding of the transformer 3. In this case, as shown in the period T1 of the diagram A of FIG. 3A, the coil current IL1 (dashed line) increases at a gradient that is determined by VL/L1 and the exciting current ILm (solid line) decreases at a gradient that is determined by −(VR/N)/Lm to result in zero ampere. When the electric power is transferred from the secondary side to the primary side of the transformer 3, the current I1 (solid line) flows in the arrow direction. In the above description, VL denotes DC voltage on the low voltage side of the secondary winding of the transformer 3 corresponding to the second voltage VL of the present invention. L1 denotes the inductance of the coil 17. VR denotes the voltage of the capacitor 13. N denotes the ratio of the number of turns of the primary and secondary windings of the transformer 3 and in the example shown in FIG. 1, the ratio is set at N:1.

When the exciting current ILm is decreased below zero ampere, as shown in the circuit diagram B of FIG. 2A, the direction in which the exciting current ILm flows is reversed. That is, the exciting current ILm flows from the second terminal of the secondary winding of the transformer 3 through the exciting inductance Lm to the first terminal of the transformer 3. As shown in the period T2 of the diagram A of FIG. 3A, the coil current IL1 continues to increase at a gradient that is determined by VL/L1 and the exciting current ILm continues to decrease at a gradient that is determined by −(VR/N)/Lm. As a result, the direction in which the current I1 flows is reversed from the direction before the exciting current ILm becomes zero ampere, as shown in the diagram B of FIG. 2A.

At step S3, the control circuit 5 generates signals to turn ON the switching elements 12, 16 and turn OFF the switching elements 11, 15 during the calculated period td2. In this case, as shown in the circuit diagram C of FIG. 2A, the coil current IL1 flows from the positive terminal of the low-voltage battery 19 through the coil 17, the secondary winding of the transformer 3, and the switching element 16 to the negative terminal of the low-voltage battery 19 in the period T3. The exciting current ILm flows from the second terminal of the secondary winding of transformer 3 through the exciting inductance Lm to the first terminal of the secondary winding of the transformer 3, so that part of the energy accumulated in the coil 17 is transferred in the capacitor 14. That is, electric power is transferred from the secondary side to the primary side of the transformer 3. The currents I1, I2 flow in the arrow directions, so that the capacitor 14 is charged. In this case, as shown in the period T3 in the diagram A of FIG. 3A, the coil current IL1 increases at a gradient that is determined by (VL−(VH/N))/L1. The exciting current ILm increases at a gradient that is determined by (VH/N)/Lm and becomes zero ampere. In the above description, VH denotes DC voltage on the high voltage side of the primary winding of the transformer 3 corresponding to the first voltage VH of the present invention.

When the exciting current ILm becomes zero ampere or higher, the direction in which the exciting current ILm flows is reversed as shown in the circuit diagram D of FIG. 2B, and the exciting current ILm flows from the first terminal of the secondary winding of the transformer 3 through the exciting inductance Lm to the second terminal of the secondary winding of the transformer 3. That is, as shown in the period T4 of the diagram A of FIG. 3A, the coil current IL1 continues to increase at a gradient that is determined by (VL−(VH/N))/L1 and the exciting current ILm continues to increase at a gradient that is determined by (VH/N)/Lm. Then, the direction in which the current I1 shown in the circuit diagram D of FIG. 2B flows is reversed from the direction before the exciting current ILm becomes zero ampere.

However, if any time exists in the period td2 that satisfies the Expression 1, which is shown below, during the processing of the step S3 using the periods td1 and td2 calculated in the step S1, failure occurs in transferring electric power from the secondary side to the primary side of the transformer 3.

$$n=VH/VL \geq 1/(1+L1/2Lm) \qquad \text{Expression 1}$$

The reason for the above failure is that, when Expression 1 is satisfied, the coil current IL1 and the exciting current ILm increase at a gradient that is determined by VL/(Lm+L1), as shown in the period T4* of the diagram A of FIG. 3A, so that the coil current IL1 and the exciting current ILm flow in directions opposite to each other, as shown in the circuit diagram E of FIG. 2B, and the values of the coil current IL1 and the exciting current ILm become substantially the same (IL1=ILm). As a result, the coil current IL1 cancels the exciting current ILm, so that no electric power is transferred from the secondary side to the primary side of the transformer 3.

For this reason, by carrying out step S1' instead of the above-described step S1, the period T4* in which no electric power is transferred is deleted. At step S1', it is determined whether Expression 1 is satisfied in each cycle time T. When Expression 1 is satisfied, the period td1' (the first period of the present invention) and the period td2' (the second period of the present invention) in which Expression 2 described below is satisfied are calculated.

$$td1'/td2' > n(1+L1/2Lm)-1 \quad \text{Expression 2}$$

That is, if the satisfaction of Expression 1 is determined, periods td1', td2', and period td3 (the third period of the present invention) that satisfy Expression 2 are calculated before the next cycle time T starts. When the next cycle type T starts, the control circuit 5 uses these periods td1', td2', and td3 in controlling the switching elements 15, 16. The processing at step S1' and the precharge operation using the periods td1', td2' will be described later.

In the step S4, the control circuit 5 turns ON the switching element 11 and OFF the switching elements 12, 15, 16 in the calculated period td3, so that the off-state loss of the switching elements 15, 16 consumes the energy left in the coil 17. When the voltage VH is low, or the voltage of the capacitor 14 is lower than a predetermined voltage on an initial stage of precharge, for example, when the voltage is zero volt, the product ET on the positive voltage side of the coil 17 is higher than the product ET on the negative voltage side of the coil 17. It is noted that the product ET on the positive voltage side of the coil 17 means the product of the voltage VL and the length of time during which the switching element 15 is turned ON and the switching element 16 is turned OFF and also that the product ET on the negative voltage side of the coil 17 means the product of the voltage VH/N and the length of time during which the switching element 15 is turned OFF and the switching element 16 is turned ON. As a result, the coil current IL1 is increased too large to be controlled. To prevent such an increase of the coil current IL1, the step S4 is carried out to suppress the increase of the coil current IL1. As shown in the circuit diagram F of FIG. 2B and also in the period T5 of the diagram A of FIG. 3A, no coil current IL1 flows. The exciting current ILm flows from the first terminal of the secondary winding of the transformer 3 through the exciting inductance Lm to the second terminal of the secondary winding of the transformer 3. The exciting current ILm decreases at a gradient determined by −(VR/N)/Lm.

The following will describe the precharge operation in which electric power transfer failure is prevented. In the step S1', when electric power is transferred from the secondary side of the transformer 3 to the primary side of the transformer 3, the control circuit 5 measures the voltage VH and the voltage VL before the next cycle time T begins and calculates the voltage ratio n, or VH/VL.

Then, the control circuit 5 compares the ratio n with a reference value J that corresponds to 1/(1+L1/2Lm) (See Expression 1) for each cycle time T before the next cycle time T starts. When the ratio n is J or larger (n≥J), the control circuit 5 calculates the period td1' during which the switching element 15 is turned ON in the cycle time T, the period td2' during which the switching element 16 is turned ON after the period td1' in the cycle time T, and the period td3 during which the switching elements 15, 16 is turned OFF after the period td2' in the cycle time T. In the periods td1' and td2', or the period (T−td3) which is calculated by subtracting the period td3 from the cycle time T, Expression 2 is satisfied. That is, the periods td1', td2' are a period during which the control circuit 5 calculates so that the period ratio dn determined by td1'/td2' is larger than the reference value dJ determined by n(1+L1/2Lm)−1 (dn>dJ).

Periods td1', td2', and td3 may be determined from a data table. For example, based on experimental or simulation data, periods td1', td2', and td3 are obtained previously in the form of a data table for each different value of ratio n. The reference data table of the ratio n and the periods td1', td2', and td3 is stored in a memory of the control circuit 5. Using the ratio n that is calculated based on the voltage VH and the voltage VL that are actually measured and referring to the above data table, the corresponding periods td1', td2', and td3 may be obtained.

The reference value J is previously calculated, for example based on the inductance L1 of the coil 17 and the exciting inductance Lm of the transformer 3 and stored in the memory of the control circuit 5. The reference value dJ is previously calculated, for example based on the ratio n, the inductance L1 of the coil 17 and the exciting inductance Lm of the transformer 3 and stored in the memory of the control circuit 5.

When the ratio n is smaller than the reference value J (n<J), there is no occurrence of a period during which no electric power is transferred at step S1' and, therefore, the control circuit 5 may turn ON/OFF the switching elements 15, 16 so that electric power is effectively transferred.

When Expression 2 is satisfied, the control circuit 5 turns ON/OFF the switching elements 15, 16 in the periods td1', td2', and td3 so that no cancelling of the coil current IL1 by the exciting current ILm occurs, as shown in the circuit diagram E of FIG. 2B and the period T4* in the diagram A of FIG. 3A. That is, as shown in the cycle time T including the periods T1', T2', T3', T4', and T5 in the diagram B of FIG. 3A, the period T4* during which no electric power is transferred can be deleted. The deletion of the period T4* allows the transformer 3 to transfer electric power from the secondary side to the primary side with an improved efficiency.

Figure 3B:
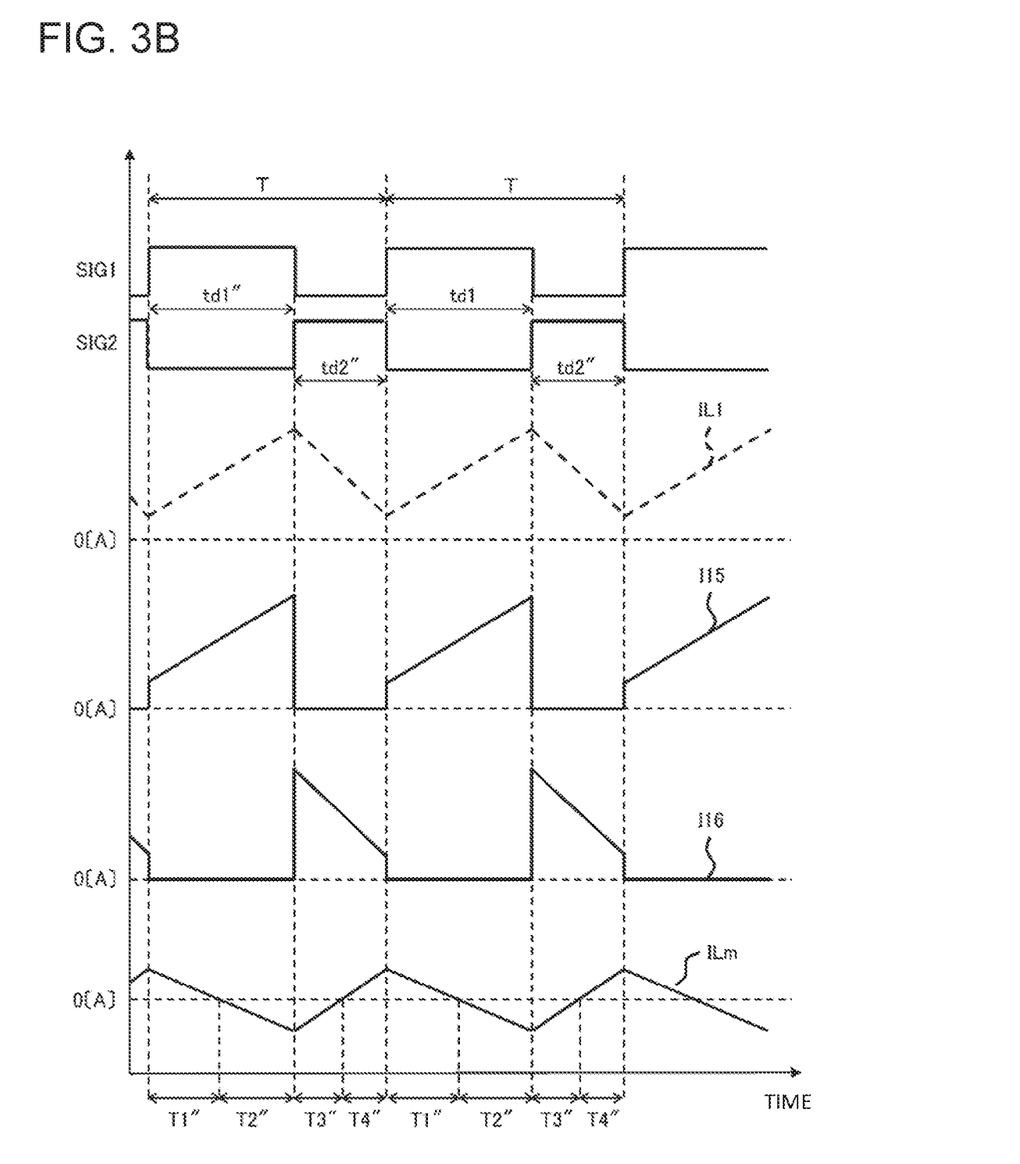
FIG. 3B is a diagram showing the control signals that control switching elements of the secondary circuit, the coil current, the exciting current, and the current that flows in the switching elements in a later stage of the precharge operation of the bidirectional insulated DC-DC converter of FIG. 1.

The following will describe another example of the first embodiment with reference to FIG. 3B. FIG. 3B is a diagram showing the control signals SIG1, SIG2 that control the switching elements 15, 16 of the secondary circuit 4, the coil current IL1, the exciting current ILm, and the currents I15, I16 that flow in the respective switching elements 15, 16 in a later stage of the precharge operation of the bidirectional insulated DC-DC converter 1 according to the first embodiment.

At steps S1 and S1' of the first embodiment, the control circuit 5 calculates the periods td1', td2' considering the period td3 (=T5) in which step S4 is carried out. According to the another example of the first embodiment, when the voltage of the capacitor 14 is increased in a later stage of the precharge, or when the voltage of the capacitor 14 is increased larger than a predetermined voltage, the product ET on the positive voltage side and the product ET on the negative voltage side of the coil 17 approach the same value. Then, the coil current IL1 becomes stable without increasing, so that the control circuit 5 need not turn OFF the switching elements 15, 16 to consume the energy left in the coil 17. As a result, the control circuit 5 need not control to turn ON/OFF the switching elements 15, 16 considering the period td3.

Then, the control circuit 5 compares the ratio n with the reference value J, or 1/(1+L1/2Lm) (See Expression 1) for each cycle time T. When the ratio n is at the reference value J or larger (n≥J), the control circuit 5 calculates the period td1" (the first period of the present invention) during which the switching element 15 is turned ON in the cycle time T before the next cycle time T and the period td2" (the second period of the present invention) during which the switching element 16 is turned ON in the cycle time T after the period td1". The periods td1" and td2" are calculated by the control circuit 5 so that the period ratio dn', or td1"/td2" is larger than the reference value dJ, or n(1+L1/2Lm)−1 (dn'>dJ).

Alternatively, the periods td1" and td2" may be determined from a data table. For example, based on experimental or simulation data, periods td1", td2" are obtained previously in the form of a data table for each different value of ratio n. The reference data table of the ratio n and the periods td1", td2" is stored in a memory of the control circuit 5. Using the ratio n that is calculated based on the voltage VH and the voltage VL that are actually measured and referring to the above data table, the corresponding periods td1", td2" may be obtained.

Thus, in a later stage of the precharge operation when the voltage of the capacitor 14 is increased, or specifically when the voltage of the capacitor 14 is larger than a predetermined voltage and dn'>dJ is satisfied, the control circuit 5 controls ON/OFF operation of the switching elements 15, 16 during the periods td1", td2" so that the period T5 is deleted. As a result, the switching loss of the switching elements 15, 16 can be reduced. When the voltage of the capacitor 14 increases with a progress of the precharge operation, the period T4* in which no electric power is transferred can be deleted as seen from the cycle time T including the periods T1", T2", T3", T4" shown in FIG. 3B. The deletion of the period T4* allows the transformer 3 to transfer electric power from the secondary side to the primary side thereof with an increased efficiency.

Second Embodiment

Figure 4:
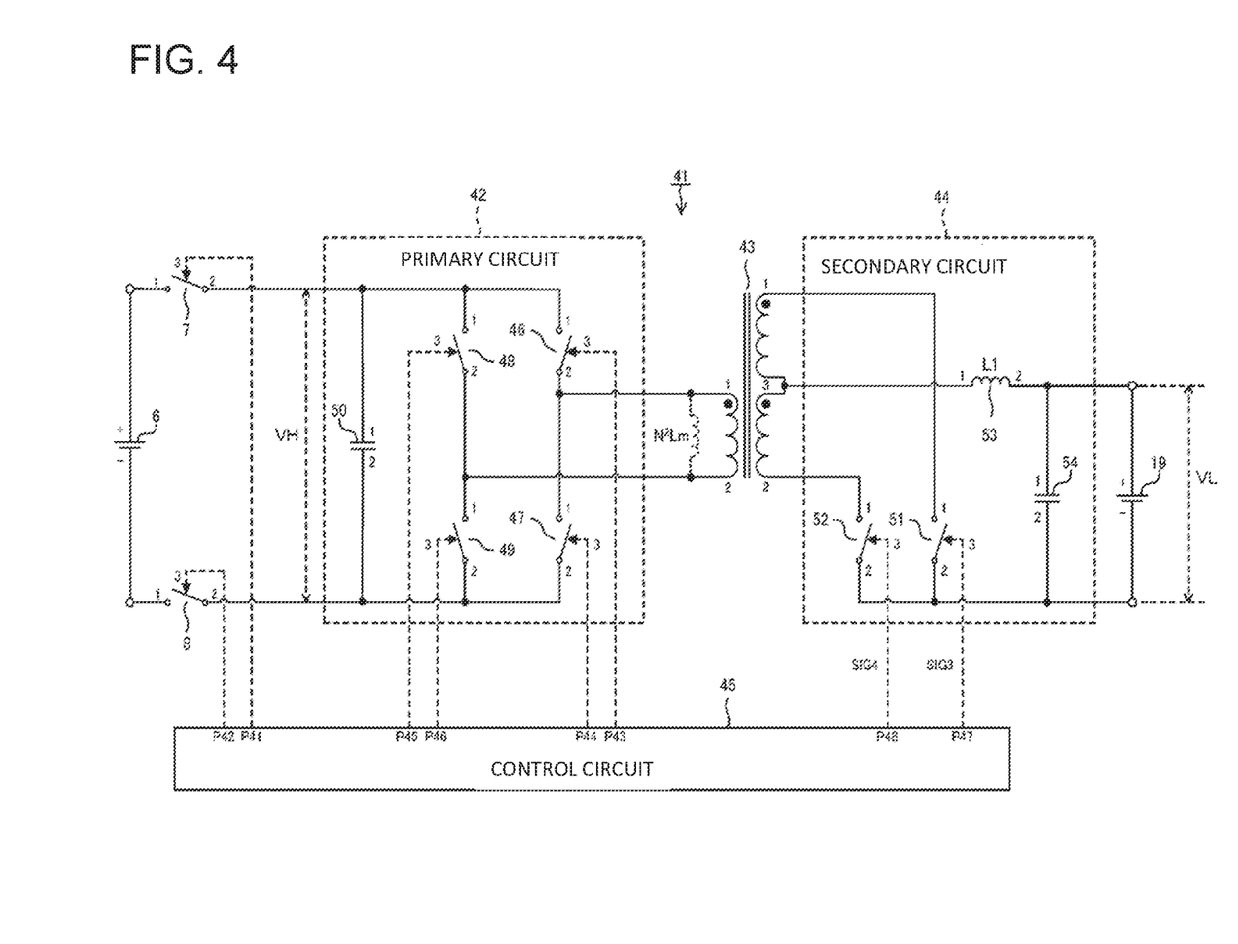
FIG. 4 is a circuit diagram of a bidirectional insulated DC-DC converter according to a second embodiment of the present invention.

The following will describe a bidirectional insulated DC-DC converter 41 according to a second embodiment of the present invention with reference to FIG. 4. The bidirectional insulated DC-DC converter 41 is a forward DC-DC converter of a full-bridge system, including a primary circuit 42, a transformer 43, a secondary circuit 44, and a control circuit 45.

The primary circuit 42 includes switching elements 46, 47, 48, 49 and a capacitor 50. The primary circuit 42 is connected in parallel to the high-voltage battery 6 via the relay 7 and the relay 8 on the high voltage side of the primary circuit 42 and to a primary winding of the transformer 43 on the low voltage side of the primary circuit 42. The positive terminal (+) of the high-voltage battery 6 is connected to the first terminal (1) of the relay 7. The negative terminal (−) of the high-voltage battery 6 is connected to the first terminal (1) of the relay 8. The second terminal (2) of the relay 7 is connected to the first terminal (1) of the switching element 46, the first terminal (1) of the switching element 48, and the first terminal (1) of the capacitor 50. The second terminal (2) of the relay 8 is connected to the second terminal (2) of the switching element 47, the second terminal (2) of the switching element 49, and the second terminal (2) of the capacitor 50. The first terminal (1) of the first winding of the transformer 43 is connected to the second terminal (2) of the switching element 46 and the first terminal (1) of the switching element 47. The second terminal (2) of the first winding of the transformer 43 is connected to the second terminal (2) of the switching element 48 and the first terminal (1) of the switching element 49. The third terminal (3) of the relay 7 is connected to a control terminal P41 of the control circuit 45. The third terminal (3) of the relay 8 is connected to the control terminal P42 of the control circuit 45. The third terminal (3) of the switching element 46 is connected to the control terminal P43 of the control circuit 45. The third terminal (3) of the switching element 47 is connected to the control terminal P44 of the control circuit 45. The third terminal (3) of the switching element 48 is connected to the control terminal P45 of the control circuit 45. The third terminal (3) of the switching element 49 is connected to the control terminal P46 of the control circuit 45.

The secondary circuit 44 includes a switching element 51 (the first switching element of the present invention), a switching element 52 (the second switching element of the present invention), a coil 53, and a capacitor 54. The secondary circuit 44 is connected in parallel to the secondary winding of the transformer 43 on the high voltage side of the secondary circuit 44 and to the low-voltage battery 19 on the low voltage side of the secondary circuit 44. The first terminal (1) of the switching element 51 is connected to the first terminal (1) of the secondary winding of the transformer 43. The first terminal (1) of the switching element 52 is connected to the second terminal (2) of the secondary winding of the transformer 43. The first terminal (1) of the coil 53 is connected to the intermediate third terminal (3) of the secondary winding of the transformer 43. The second terminal (2) of the coil 53 is connected to the first terminal (1) of the capacitor 54 and the positive terminal (+) of the low-voltage battery 19. The second terminal (2) of the switching element 51 and the second terminal (2) of the switching element 52 are connected to the second terminal (2) of the capacitor 54 and the negative terminal (−) of the low-voltage battery 19. The third terminal (3) of the switching element 51 is connected to the control terminal P47 of the control circuit 45. The third terminal (3) of the switching element 52 is connected to the control terminal P48 of the control circuit 45.

The control circuit 45 controls ON/OFF operation of the relays 7, 8 and the switching elements 46, 47, 48, 49, 51, 52 for controlling charging of the low-voltage battery 19 by electric power supplied from the high-voltage battery 6 (i.e. controlling by full-bridge system) and charging of the capacitor 50 by the voltage of the low-voltage battery 19 (i.e. precharge controlling by the full-bridge system). The control circuit 45 includes a programmable device such as a Central Processing Unit (CPU) and a multi-core CPU.

When the control circuit 45 generates signals to turn ON the relays 7, 8, the high-voltage battery 6 is connected to the capacitor 50. When the control circuit 45 generates signals to turn OFF the relays 7, 8, the high-voltage battery 6 is disconnected from the capacitor 50.

The switching elements 46, 47, 48, 49, 51, 52 may be provided by a semiconductor switching device such as a MOSFET and an IGBT. For example, when the switching device is an N-channel MOSFET, the first terminals (1) of the switching elements 46, 47, 48, 49, 51, 52 are a drain terminal and the second terminals (2) are a source terminal and the third terminals (3) are a gate terminal. It is noted that a control signal SIG3 generated from the control terminal P47 of the control circuit 45 is a signal for controlling ON/OFF operation of the switching element 51 and a control signal SIG4 generated from the control terminal P48 of the control circuit 45 is a signal for controlling ON/OFF operation of the switching element 52.

Figure 5A:
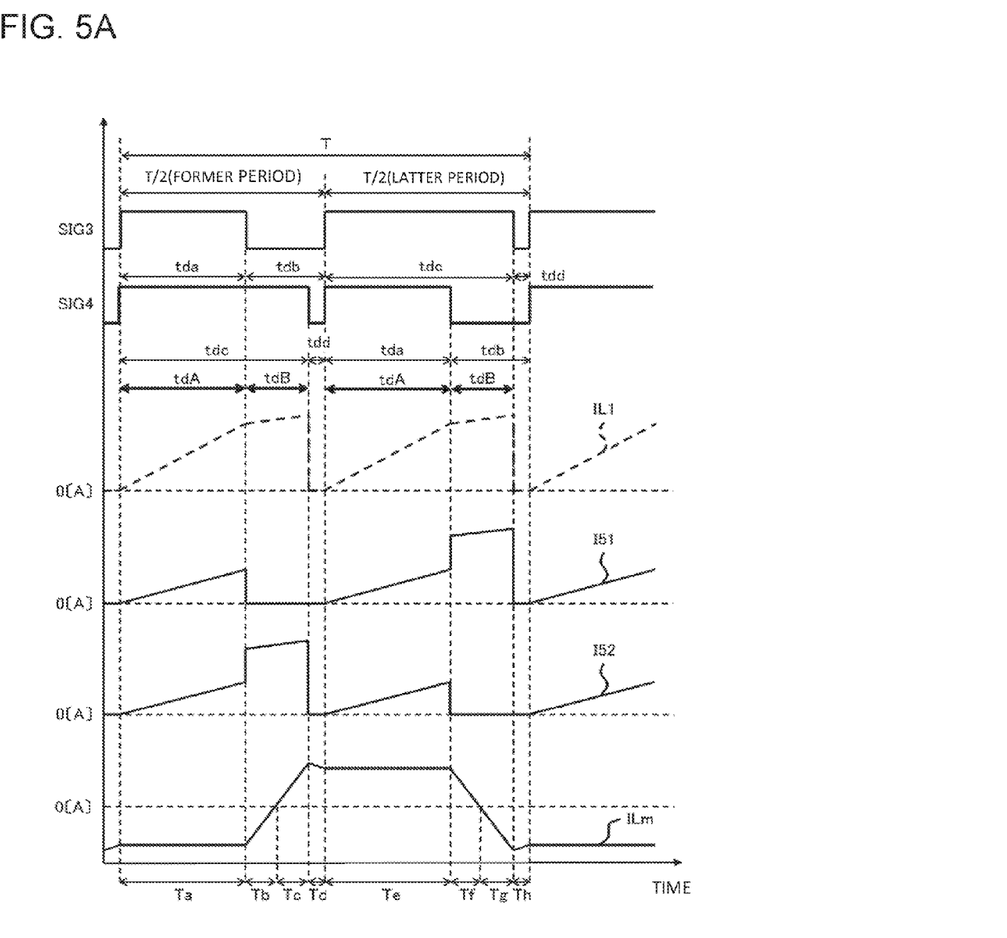
FIG. 5A is a diagram showing the control signals that control the switching elements of the secondary circuit, the coil current, the exciting current, and the current that flows in the switching elements in an initial stage of precharge operation of the bidirectional insulated DC-DC converter of FIG. 4.

The following will describe the precharge operation of the bidirectional insulated DC-DC converter 41 according to the second embodiment of the present invention referring to FIG. 5A. FIG. 5A is a diagram showing the control signals SIG3, SIG4 that control the switching elements 51, 52 of the secondary circuit 44, the coil current IL1, the exciting current ILm, and the currents 151 and 161 that flow in the respective switching elements 51 and 61 when the electric power transfer failure is prevented in the initial stage of the precharge operation of the bidirectional insulated DC-DC converter 41.

In carrying out the precharge, or transferring electric power from the secondary side to the primary side of the transformer 43, the control circuit 45 generates signals to turn OFF the relays 7, 8 and a sequence of steps S11 to S17, which will be described later, is repeated for each cycle time T thereby to charge the capacitor 50 to a predetermined voltage.

At step S1, when electric power is transferred from the secondary side to the primary side of the transformer 3, the control circuit 45 receives data of the voltage VH and the voltage VL for each cycle time T or for each half cycle time T/2 before the next cycle time T or the next half cycle time T/2 starts, and then calculates the voltage ratio n, or VH/VL.

If Expression 1 is satisfied, the coil current IL1 and the exciting current ILm flow varying at the same gradient in opposite directions to each other in each cycle time T/2 and at the same value (or IL1=ILm). Therefore, the coil current IL1 and the exciting current ILm cancel each other, so that no electric power is transferred from the secondary side to the primary side of the transformer 43. The control circuit 45 compares the ratio n with the reference value J, or 1/(1+L1/2Lm) (See Expression 1) for each cycle time T or each half cycle time T/2, before the next cycle time T or the next cycle time T/2 starts. If Expression 1 is satisfied, the control circuit 5 calculates period tdA (the first period of the present invention) and period tdB (the second period of the present invention) during which Expression 3 shown below is satisfied.

$$tdA/tdB > n(1+L1/2Lm)-1 \qquad \text{Expression 3}$$

In the period (T/2−tdd) which is obtained by subtracting the period tdd (the third period of the present invention) from the cycle time T/2, the control circuit 45 calculates the periods tdA and tdB according to which the period ratio dnn, or tdA/tdB is larger than the reference value dJ, or n(1+L1/2Lm)−1 (dnn>dJ).

Period tdA is the period (tda & tdc) during which the control circuit 45 turns ON the switching elements 51, 52 in the former half of the cycle time T (the period for T/2 as counted from the beginning of the cycle time T) and in the latter period of the cycle time T (the period for T/2 as counted from the beginning of the latter half of the cycle time T to the end of the cycle time T). That is, energy is accumulated in the coil 53 in the period tdA.

As shown in FIG. 5A, the control circuit 45 turns ON the switching element 51 during the period tda in the former half of the cycle time T and turns ON the switching element 52 during the period tda in the latter half of the cycle time T. The control circuit 45 turns ON the switching element 51 during the period tdc in the latter half of the cycle time T and turns ON the switching element 52 during the period tdc in the former half of the cycle time T.

The control circuit 45 turns OFF the switching element 51 and turns ON the switching element 52 during the period tdB, or the period (tdb−tdd) in the former half of the cycle time T. The control circuit 45 turns ON the switching element 51 and turns OFF the switching element 51 in the period tdB, or the period (tdb−tdd) in the latter half of the cycle time T. That is, part of the energy accumulated in the coil 53 is transferred from the secondary side to the primary side of the transformer 43 and the capacitor 50 is charged in the period tdB, accordingly. As shown in FIG. 5A, the control circuit 45 turns OFF the switching element 51 during the period tdb in the former half of the cycle time T and turns OFF the switching element 52 during the period tdb in the latter half of the cycle time T.

The control circuit 45 turns OFF the switching elements 51, 52 during the period tdd in the former half and latter half of the cycle time T. That is, as shown in FIG. 5A, the period tdd is a period during which the off-state loss of the switching elements 51, 52 consumes the energy left in the coil 53.

At step S12, the control circuit 45 turns On the switching elements 51, 52 during the period Ta, or the period tdA in the former half of the cycle time T as shown in FIG. 5A and energy is accumulated in the coil 53, accordingly.

At step S13, the control circuit 45 turns OFF the switching element 51 and turns ON switching element 52 in the periods Tb and Tc as shown in FIG. 5A, so that the capacitor 50 is charged. In the period Tc, Expression 3 is satisfied, so that electric power is transferred from the secondary side to the primary side of the transformer 43.

At step S14, the control circuit 45 turns OFF the switching elements 51, 52 in the period Td, or the period tdd in the former half of the cycle time T as shown in FIG. 5A, so that the off-state loss of the switching elements 51, 52 consume the energy left in the coil 53.

At step S15, the control circuit 45 turns ON the switching elements 51, 52 in the period Te, or the period tdA in the latter half of the cycle time T as shown in FIG. 5A, so that energy in the coil 53 is accumulated.

At step S16, the control circuit 45 turns OFF the switching element 52 and turns ON the switching element 51 in the periods Tf and Tg as shown in FIG. 5A, so that the capacitor 50 is charged. In the period Tg, Expression 3 is satisfied, so that electric power is transferred from the secondary side to the primary side of the transformer 43.

At step S17, the control circuit 45 turns OFF the switching elements 51, 52 in the period Th, or the period tdd in the latter half of the cycle time T as shown in FIG. 5A, so that the off-state loss of the switching elements 51, 52 consumes the energy left in the coil 53.

Periods tdA, tdB, tdd and periods tda, tdb, tdc may be determined from a data table. For example, based on experimental or simulation data, periods tdA, tdB, tdd and periods tda, tdb, tdc are obtained previously in the form of a data table for each different ratio n. The reference data table of the ratio n, the periods tdA, tdB, tdd and the periods tda, tdb, tdc is stored in the memory of the control circuit 5. Using the ratio n that is calculated based on the voltage VH and the voltage VL that are actually measured and referring to the above data table, the corresponding periods tdA, tdB, tdd and periods tda, tdb, tdc may be obtained.

The reference value J is previously calculated, for example based on the inductance L1 of the coil 53 and the exciting inductance Lm of the transformer 43 and stored in the memory of the control circuit 45. The reference value dJ is previously calculated, for example based on the ratio n, the inductance L1 of the coil 53, and the exciting inductance Lm of the transformer 43 and stored in the memory of the control circuit 45.

The control circuit 45 compares the ratio n with the reference value J for each cycle time T or for each half cycle time T/2. If the ratio n is smaller than the reference value J (n<J), the control circuit 45 may turn ON/OFF the switching elements 15, 16 even if Expression 3 is not satisfied, and electric power is effectively transferred, accordingly.

When Expression 3 is satisfied, the control circuit 45 may turn ON/OFF the switching elements 51, 52 in the periods tdA, tdB, tdd and tda, tdb, tdc so as to prevent the coil current IL1 and the exciting current ILm from cancelling each other. That is, as appreciated from the cycle time T including the periods Ta, Tb, Tc, Td, Te, Tf, Tg, and Th shown in FIG. 5A, the period during which no electric power is transferred can be deleted. The reduction of such period allows the transformer 43 to transfer electric power from the secondary side to the primary side thereof with an improved efficiency.

Figure 5B:
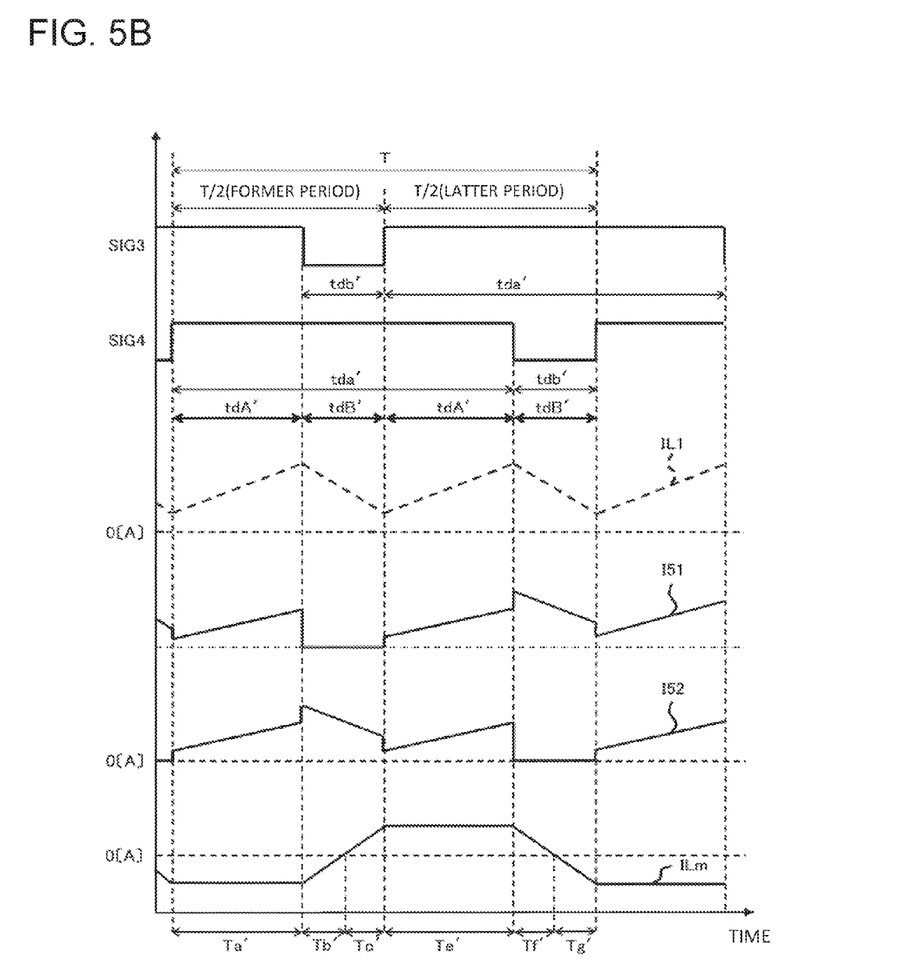
FIG. 5B is a diagram showing the control signals that control the switching elements of the secondary circuit, the coil current, the exciting current, and the current that flows in the switching elements in the precharge operation in which failure in electric power transfer is avoided in a later stage of the precharge operation of the bidirectional insulated DC-DC converter of FIG. 4.

The following will describe a modified example 1 of the second embodiment with reference to FIG. 5B. FIG. 5B is a diagram showing the control signals SIG3, SIG4 that control the switching elements 51, 52 of the secondary circuit 44, the coil current IL1, the exciting current ILm, and the respective currents I51, I52 that flow in the switching elements 51, 52 in the precharge operation in a case in which failure in electric power transfer is prevented in an later stage of the precharge operation of the bidirectional insulated DC-DC converter 41 of the second embodiment.

In the processing at step S11 in the bidirectional insulated DC-DC converter 41 according to the second embodiment, the control circuit 45 calculates the periods tdA, tdB, tdd and tda, tdb, tdc considering the period tdd (=Td) in which step S4 is carried out. When the voltage of the capacitor 50 is increased with a progress of the precharge operation, or when the voltage of the capacitor 50 is increased larger than a predetermined voltage, the product ET on the positive voltage side of the coil 53 and the product ET on the negative voltage side of the coil 53 approach the same value, so that the coil current IL1 becomes stable without being increased. Therefore, the control circuit 45 need not consume the energy left in the coil 53 by turning OFF the switching elements 51, 52. As a result, the control circuit 45 need not control the ON/OFF operation of the switching elements 15, 16 considering the period tdd.

Then, the control circuit 45 compares the ratio n with the reference value J, or 1/(1+L1/2Lm) (See Expression 1). If the ratio n is the reference value J or larger (n≥J), the control circuit 45 calculates the period tdA' (the first period of the present invention) during which the switching elements 51, 52 are turned ON in the cycle time T or half the cycle time T/2 before the next cycle time T or next half the cycle time T/2, the period tdB' (the second period of the present invention) during which the switching element 52 is turned ON in the cycle time T or half the cycle time T/2 after the period tdA', and the periods tda', tdb'.

Periods tdA' and tdB' are such periods that are calculated by the control circuit 45 and satisfy the condition that the period ratio dnn, or tdA'/tdB', is larger than the reference value dJ, or n(1+L1/2Lm)−1) (dnn'>dJ).

Periods tdA', tdB', tda', and tdb' may be determined from a data table. For example, based on experimental or simulation data, periods tdA', tdB', tda', and tdb' are obtained previously in form of a data table for each different value of ratio n. The reference data table of the ratio n and the periods tdA', tdB', tda', and tdb' is stored in a memory of the control circuit 45. Using the ratio n that is calculated based on the voltage VH and the voltage VL that are actually measured and referring to the above data table, the corresponding periods tdA', tdB', tda', and tdb' may be obtained.

When the voltage of the capacitor 50 is increased with a progress of the precharge operation, or when the voltage of the capacitor 50 is increased larger than a predetermined voltage and dnn'>dJ is satisfied, the control circuit 45 controls the ON/OFF operation of the switching elements 51, 52 in the periods tdA', tdB' and the periods tda', tdb' so that the period Td may be deleted as shown in FIG. 5B and the switching loss of the switching elements 51, 52 may be reduced, accordingly. Even if the voltage of the capacitor 50 is increased with a progress of the precharge operation, the period during which no electric power is transferred can be deleted, as appreciated from the cycle time T including the periods Ta', Tb', Tc', Te', Tf', Tg' shown in FIG. 5B. The deletion of the period during which no electric power is transferred allows the transformer 43 to transfer the electric power from the secondary side to the primary side thereof with an improved efficiency.

Figure 6:
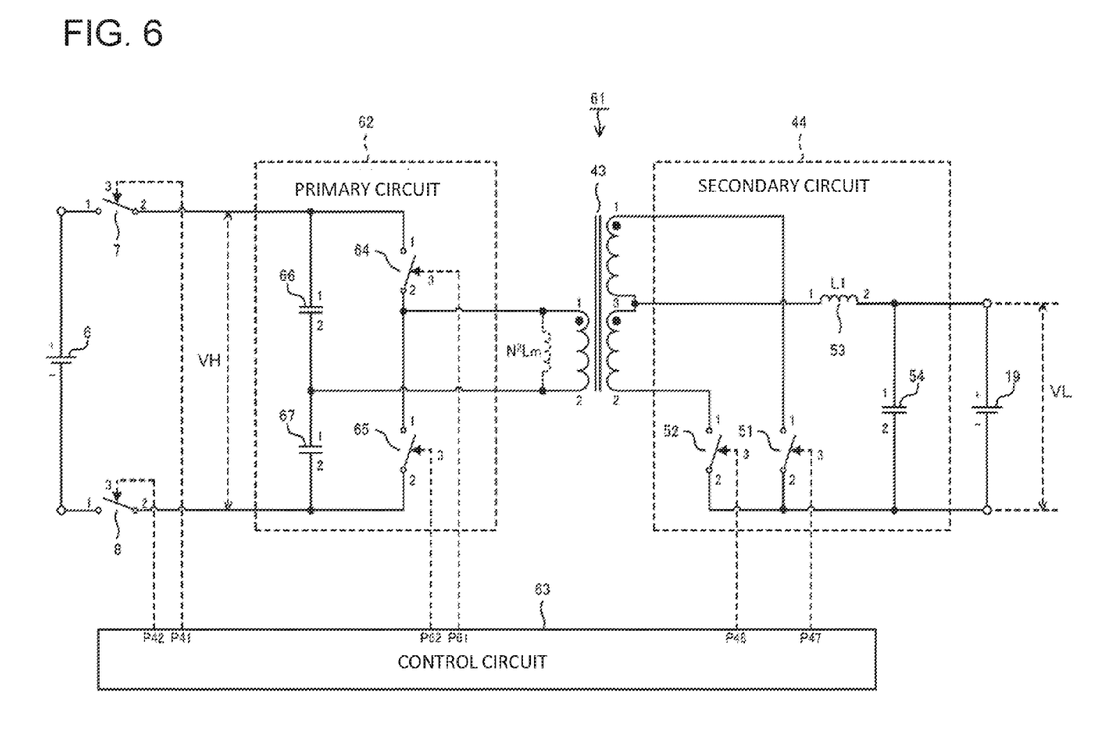
FIG. 6 is a circuit diagram of a bidirectional insulated DC-DC converter of a half-bridge system as a modification of the second embodiment of the present invention.

The following will describe a modified example 2 of the bidirectional insulated DC-DC converter according to the second embodiment. Controlling of the precharge operation may be applied to a bidirectional insulated DC-DC converter of a half-bridge system shown in FIG. 6. FIG. 6 is a circuit diagram of a bidirectional insulated DC-DC converter 61 of a half-bridge system as the modified example 2 according to the second embodiment of the present invention. The bidirectional insulated DC-DC converter 61 includes a primary circuit 62, the transformer 43, the secondary circuit 44, and a control circuit 63.

The primary circuit 62 includes a switching element 64, a switching element 65, a capacitor 66, and a capacitor 67. The primary circuit 62 is connected in parallel to the high-voltage battery 6 via the relay 7 and the relay 8 on the high voltage side of the primary circuit 62 and to a primary winding of the transformer 43 on the low voltage side of the primary circuit 62. The positive terminal (+) of the high-voltage battery 6 is connected to the first terminal (1) of the relay 7. The negative terminal (−) of the high-voltage battery 6 is connected to the first terminal (1) of the relay 8. The second terminal (2) of the relay 7 is connected to the first terminal (1) of the switching element 64 and the first terminal (1) of the capacitor 66. The second terminal (2) of the relay 8 is connected to the second terminal (2) of the switching element 65 and the second terminal (2) of the capacitor 67. The first terminal (1) of the first winding of the transformer 43 is connected to the second terminal (2) of the switching element 64 and the first terminal (1) of the switching element 65. The second terminal (2) of the first winding of the transformer 43 is connected to the second terminal (2) of the capacitor 66 and the first terminal (1) of the capacitor 67. The third terminal (3) of the relay 7 is connected to a control terminal P41 of the control circuit 63. The third terminal (3) of the relay 8 is connected to the control terminal P42 of the control circuit 63. The third terminal (3) of the switching element 64 is connected to the control terminal P61 of the control circuit 63. The third terminal (3) of the switching element 65 is connected to the control terminal P62 of the control circuit 63.

The secondary circuit 44 has the same configuration as that which is shown in FIG. 4 and includes a switching element 51 (the first switching element of the present invention), a switching element 52 (the second switching element of the present invention), a coil 53, and a capacitor 54. The control circuit 63 generates signals for control the ON/OFF operation of the relays 7, 8 and the switching elements 64, 65, 51, 52 thereby to control charging of the low-voltage battery 19 by the electric power supplied from the high-voltage battery 6 (or controlling by a half-bridge system) and also charging of the capacitors 66, 67 by the voltage of the low-voltage battery 19 (or precharge controlling by a half-bridge system). The control circuit 63 includes a programmable device such as a CPU and a multi-core CPU.

The switching elements 64, 65 may be provided by a semiconductor switching device such as a MOSFET and an IGBT. For example, when the switching device is an N-channel MOSFET, the first terminals (1) of the switching elements 64, 65 are a drain terminal and the second terminals (2) are a source terminal and the third terminals (3) are a gate terminal.

In carrying out the precharge operation, or transferring electric power from the secondary side to the primary side of the transformer 43, the control circuit 63 generates signals to turn OFF the relays 7, 8 and thereafter step S11 to step S17 which have been described earlier are executed for each cycle time T or for each half the cycle time T/2 so that the capacitors 66, 67 are charged to a predetermined voltage.

When Expression 3 is satisfied in the modified example 2 according to the second embodiment, the control circuit 63 turns ON/OFF the switching elements 51, 52 in the periods tdA, tdB, tdd and the periods tda, tdb, tdc so that no cancelling of the coil current IL1 and the exciting current ILm occurs. That is, as appreciated from the cycle time T including the periods Ta, Tb, Tc, Td, Te, Tf, Tg, Th shown in FIG. 5A, the period in which no electric power is transferred can be deleted. The deletion of the period allows the transformer 43 to transfer electric power from the secondary side to the primary side with an increased efficiency.

When the voltages of the capacitors 66, 67 is increased with a progress of the precharge operation, or when the voltage of the capacitor 66, 67 is increased larger than a predetermined voltage and dnn'>dJ, the control circuit 45 controls the ON/OFF operation of the switching elements 51, 52 during the periods tdA', tdB' and the periods tda', tdb' so that the period Td is deleted as shown in FIG. 5B. As a result, the switching loss of the switching elements 51, 52 can be reduced. When the voltages of the capacitors 66, 67 is increased with a progress of the precharge operation, the period during which no electric power is transferred can be deleted as appreciated from the cycle time T including the periods Ta', Tb', Tc', Te', Tf', Tg' shown in FIG. 5B. The deletion of such period allows the transformer 43 to transfer electric power from the secondary side to the primary side with an improved efficiency.

Figure 7:
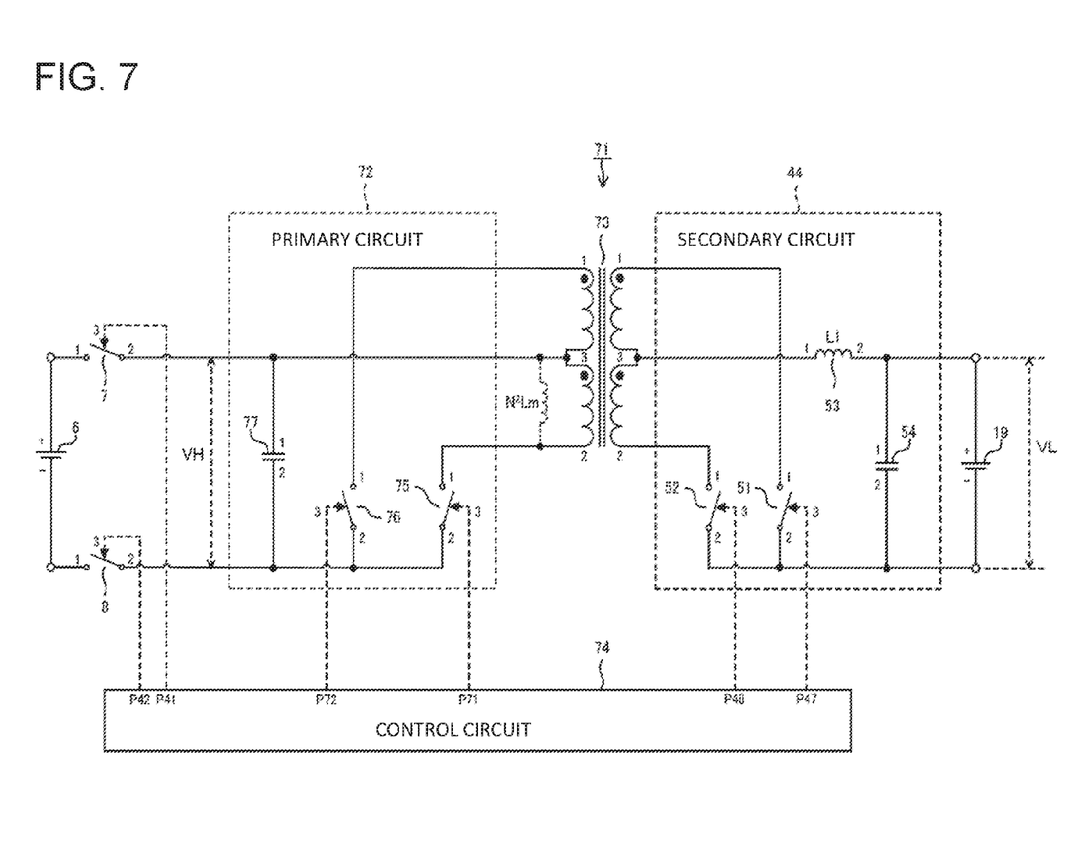
FIG. 7 is a circuit diagram of a bidirectional insulated DC-DC converter of a push-pull system as a modification of the second embodiment of the present invention.

The following will describe a modified example 3 of the bidirectional insulated DC-DC converter according to the second embodiment. Controlling of the precharge operation which has been described with reference to the second embodiment can be applied to a bidirectional insulated DC-DC converter of a push-pull system which is shown in FIG. 7. FIG. 7 is a circuit diagram of a bidirectional insulated DC-DC converter 71 of a push-pull system as the modified example 2 according to the second embodiment of the present invention. The bidirectional insulated DC-DC converter 71 includes a primary circuit 72, a transformer 73, the secondary circuit 44, and a control circuit 74.

The primary circuit 72 includes a switching element 75, a switching element 76, and a capacitor 77. The primary circuit 72 is connected in parallel to the high-voltage battery 6 via the relay 7 and the relay 8 on the high voltage side of the primary circuit 72 and to a primary winding of the transformer 73 on the low voltage side of the primary circuit 72. The positive terminal (+) of the high-voltage battery 6 is connected to the first terminal (1) of the relay 7. The negative terminal (−) of the high-voltage battery 6 is connected to the first terminal (1) of the relay 8. The second terminal (2) of the relay 7 is connected to the intermediate terminal, or the third terminal (3) of the primary winding of the transformer 73 and the first terminal (1) of the capacitor 77. The second terminal (2) of the relay 8 is connected to the second terminal (2) of the switching element 75, the second terminal (2) of the switching element 76, and the second terminal (2) of the capacitor 77. The first terminal (1) of the primary winding of the transformer 73 is connected to the first terminal (1) of the switching element 76. The second terminal (2) of the primary winding of the transformer 73 is connected to the first terminal (1) of the switching element 75. The third terminal (3) of the relay 7 is connected to a control terminal P41 of the control circuit 74. The third terminal (3) of the relay 8 is connected to the control terminal P42 of the control circuit 74. The third terminal (3) of the switching element 75 is connected to the control terminal P71 of the control circuit 74. The third terminal (3) of the switching element 76 is connected to the control terminal P72 of the control circuit 74.

The secondary circuit 44 has the same configuration as that which is shown in FIG. 4 and includes the switching element 51 (the first switching element of the present invention), the switching element 52 (the second switching element of the present invention), the coil 53, and the capacitor 54. The control circuit 74 generates signals to control the ON/OFF operation of the relays 7, 8 and the switching elements 75, 76, 51, 52 thereby to control charging of the low-voltage battery 19 by the electric power supplied from the high-voltage battery 6 (controlling by a push-pull system) and for charging the capacitor 77 by the voltage of the low-voltage battery 19 (controlling by a push-pull system). The control circuit 74 includes a programmable device such as a CPU and a multi-core CPU.

The switching elements 75, 76 may be provided by a semiconductor switching device such as a MOSFET and an IGBT. For example, when the switching device is an N-channel MOSFET, the first terminals (1) of the switching elements 75, 76 are a drain terminal and the second terminals (2) are a source terminal and the third terminals (3) are a gate terminal.

In carrying out the precharge operation or transferring electric power from the secondary side to the primary side of the transformer 73, the control circuit 74 generates signals to turn OFF the relays 7, 8, so that step S11 to S17 which has been described above are repeated for each cycle time T or for each half the cycle time T/2 to charge the capacitor 77 to a predetermined voltage.

When Expression 3 is satisfied in the modified example 3 of the second embodiment, the control circuit 74 controls the ON/OFF operation of the switching elements 51, 52 in the periods tdA, tdB, tdd and the periods tda, tdb, tdc so that no cancelling of the coil current IL1 and the exciting current ILm occurs. That is, as appreciated from the cycle time T including the periods Ta, Tb, Tc, Td, Te, Tf, Tg, Th shown in FIG. 5A, the period during which no electric power is transferred can be deleted. The deletion of such period allows the transformer 73 to transfer electric power from the secondary side to the primary side with an improved efficiency.

When the voltage of the capacitor 77 is increased with a progress of the precharge operation, or when the voltage of the capacitor 67 is increased larger than a predetermined voltage and dnn'>dJ, the control circuit 74 controls the ON/OFF operation of the switching elements 51, 52 during the periods tdA', tdB' and the periods tda', tdb' so that the period Td is deleted, as shown in FIG. 5B. As a result, the switching loss of the switching elements 51, 52 can be reduced. When the voltage of the capacitor 77 is increased with a progress of the precharge operation, the period during which no electric power is transferred can be deleted as seen from the cycle time T including the periods Ta', Tb', Tc', Te', Tf', Tg' shown in FIG. 5B. The deletion of such period allows the transformer 73 to transfer electric power from the secondary side to the primary side with an improved efficiency.

The present invention is not limited to the above embodiments and may be modified within the scope of the present invention.

What is claimed is:

1. A bidirectional insulated DC-DC converter comprising:
a transformer having a primary winding and a secondary winding;
a secondary circuit connected to the secondary winding of the transformer and including a coil, a first switching element, and a second switching element, wherein a first terminal of the coil and a first terminal of the first switching element are connected to a first terminal of the secondary winding of the transformer, wherein a first terminal of the second switching element is connected to a second terminal of the secondary winding, and wherein a second terminal of the first switching element and a second terminal of the second switching element are connected to each other; and
a control circuit controlling the first switching element and the second switching element, wherein when electric power is transferred from the secondary side to the primary side of the transformer, the control circuit measures a first voltage VH that denotes a DC voltage of the primary winding on a high voltage side of the transformer and a second voltage VL that denotes a DC voltage of the secondary winding on a low voltage side of the transformer in each cycle time, wherein the control circuit calculates a voltage ratio n, or VH/VL, and wherein when the voltage ratio n is a reference value J, or 1/(1+L1/2Lm) or larger, where L1 denotes inductance of the coil and Lm denotes exciting inductance of the transformer, the control circuit calculates a first period during which the control circuit turns ON the first switching element and a second period during which the control circuit turns ON the second switching element after the first period of the cycle time so that a period ratio dn, or the first period/the second period is larger than a reference value dJ, or n(1+L1/2Lm)−1 and controls the first switching element and the second switching element based on the first period and the second period.

2. The bidirectional insulated DC-DC converter according to claim 1, wherein when the first voltage VH is smaller than a predetermined voltage, the control circuit calculates a third period during which the control circuit turns OFF the first switching element and the second switching element of the cycle time, and wherein the control circuit turns OFF the first switching element and the second switching element in the third period after the second period.

3. The bidirectional insulated DC-DC converter according to claim 1, wherein the bidirectional insulated DC-DC converter is an active clamp forward converter.

4. A bidirectional insulated DC-DC converter comprising:
a transformer having a primary winding and a secondary winding;
a secondary circuit connected to the secondary winding of the transformer and including a coil, a first switching element, and a second switching element; wherein a first terminal of the first switching element is connected to a first terminal of the secondary winding of the transformer, wherein a first terminal of the second switching element is connected to a second terminal of the secondary winding, wherein a first terminal of the coil is connected to a third terminal of the secondary winding, or an intermediate terminal of the secondary winding, and wherein a second terminal of the first switching element and a second terminal of the second switching element are connected to each other; and
a control circuit controlling the first switching element and the second switching element, wherein when electric power is transferred from the secondary side to the primary side of the transformer, the control circuit measures a first voltage VH that denotes a DC voltage of the primary winding on a high voltage side of the transformer and a second voltage VL that denotes a DC voltage of the secondary winding on a low voltage side of the transformer in each cycle time or in half of the cycle time, wherein the control circuit calculates a voltage ratio n, or VH/VL, and wherein when the voltage ratio n is a reference value J, or 1/(1+L1/2Lm) or larger, where L1 denotes inductance of the coil and Lm denotes exciting inductance of the transformer, the control circuit calculates a first period during which the control circuit turns ON the first switching element and the second switching element in a former half period of the cycle time and in a latter half period of the cycle time and a second period during which the control circuit turns OFF the first switching element and turns ON the second switching element after the first period in the former half period of the cycle time and turns ON the first switching element and turns OFF the second switching element after the first period in the latter half period of the cycle time so that a period ratio dn, or the first period/the second period is larger than a reference value dJ, or n(1+L1/2Lm)−1 and controls the first switching element and the second switching element based on the first period and the second period.

5. The bidirectional insulated DC-DC converter according to claim 4, wherein when the first voltage VH is smaller than a predetermined voltage, the control circuit calculates a third period during which the control circuit turns OFF the first switching element and the second switching element in the former half period of the cycle time and in the latter half period of the cycle time, and wherein the control circuit turns OFF the first switching element and the second switching element in the third period after the second period.

6. The bidirectional insulated DC-DC converter according to claim 4, wherein the bidirectional insulated DC-DC converter is a full-bridge converter.

7. The bidirectional insulated DC-DC converter according to claim 4, wherein the bidirectional insulated DC-DC converter is a half-bridge converter.

8. The bidirectional insulated DC-DC converter according to claim 4, wherein the bidirectional insulated DC-DC converter is a push-pull converter.

* * * * *